United States Patent [19]
Clifton

[11] Patent Number: 5,829,248
[45] Date of Patent: Nov. 3, 1998

[54] ANTI-POLLUTION SYSTEM

[75] Inventor: Brian J. Clifton, Sudbury, Mass.

[73] Assignee: Environmental Engineering Corp., Davisville, R.I.

[21] Appl. No.: 879,149

[22] Filed: Jun. 19, 1997

[51] Int. Cl.[6] .................................................. F01N 3/20
[52] U.S. Cl. .............................. 60/286; 60/289; 60/298; 60/303
[58] Field of Search .............................. 60/274, 286, 289, 60/298, 299, 303

[56] References Cited

U.S. PATENT DOCUMENTS

| | | | |
|---|---|---|---|
| 5,320,523 | 6/1994 | Stark | 60/303 X |
| 5,381,659 | 1/1995 | Loving et al. | 60/280 |
| 5,381,660 | 1/1995 | Loving et al. | 60/303 |
| 5,417,059 | 5/1995 | Hartel et al. | 60/303 X |
| 5,572,866 | 11/1996 | Loving | 60/274 |

*Primary Examiner*—Tony M. Argenbright
*Attorney, Agent, or Firm*—Barlow & Josephs, Ltd.

[57] ABSTRACT

The anti-pollution system, which removes exhaust gas pollutants, effectively eliminates carbon monoxide, unburnt hydrocarbons, odors and organic and inorganic particulates from the exhaust gases of internal combustion engines or other sources of combustion products or pollution, is provided. The radiant monolith-catalytic converter stack continuously incinerates and eliminates the undesirable and harmful pollution from the exhaust stream. An auxiliary burner, located upstream of the radiant monolith stack, provides additional heat as required to maintain the monolith stack at a temperature to provide radiant heat energy to incinerate soot particles and unburnt hydrocarbons in the exhaust gas stream. The hot exhaust gases flow through a heat exchanger to recover heat from the exiting hot exhaust gases, to preheat the incoming exhaust gas stream while simultaneously cooling the outgoing cleaned exhaust gas stream. A microcomputer controls the operation of the anti-pollution system by monitoring temperatures, pressures, and burner parameters, and senses the operational parameters of the primary internal combustion engine or other pollution source generating the exhaust gas stream. Automatic system start, run and shutdown are handled by the microcomputer.

28 Claims, 1 Drawing Sheet

ANTI-POLLUTION SYSTEM

BACKGROUND OF THE INVENTION

The present invention relates generally to controlling emissions from exhaust gas. More specifically, the present invention relates to the field of controlling emissions from exhaust gas streams, and particularly to particulate, carbon monoxide and unburnt hydrocarbons emitted in diesel engine exhaust gas.

Exhaust gas emissions from hydrocarbon burning engines are of great concern in contributing to atmospheric pollution, photochemically induced smogs, and global warming. Increasingly strict emissions regulations have stimulated the development of cleaner burning engines, cleaner fuel formulations, and catalytic converter systems, as well as mandates for zero-emission vehicles in certain geographic regions. Unfortunately zero-emission vehicles simply transfer the pollution source from distributed mobile engines to a fixed central generating facility. While this may alleviate pollution within a metropolitan urban area, it probably does little for the overall pollution of the environment. Noxious exhaust emissions from gasoline engines have been very effectively reduced over the past few decades by the application of catalytic converter techniques. Unfortunately the pollution from diesel engines has remained more or less unabated during this same period. The present invention disclosed herein is particularly suited to the clean-up of pollution from diesel exhaust in bus, truck, marine, locomotive, and stationary generators.

Pollutants from diesel engines include carbon monoxide (CO), carbon dioxide ($CO_2$), hydrocarbons (CxHx), nitrogen oxides ($NO_x$), and soot. Although CO and CxHx can be reduced using conventional catalyst techniques, the soot in the exhaust stream cannot be burnt at the operating temperatures achieved by normal catalysts, and the catalyst support monolith material becomes blocked or clogged with soot particles.

In the prior art, there have been many attempts to solve the aforementioned problems associated with pollutants from diesel engines. Numerous filter trap techniques have been developed for diesel engine exhaust. Some filter techniques simply require removal and replacement of the filter element, others require thermal regeneration in which an auxiliary heat source is used to burn off the accumulated carbon particulate. Unfortunately, thermal burn off often leads to hot spots and to cracking or melting of the filter media. Other regeneration techniques have employed compressed air to remove soot particles from the filter media where they are passed to an incineration chamber for burning. Continuous burning systems, while effective, require high temperatures and long flow paths, which result in large and inefficient systems.

Therefore, it is desirable for an anti-pollution system for diesel engines to be efficient with an associated low cost of operation and maintenance. Further, it is desirable that the anti-pollution system be easily retrofittable to existing exhaust systems and effectively eliminate substantially all of the particulate matter in the exhaust without significantly increasing the temperature of the exhaust discharged to the atmosphere.

SUMMARY OF THE INVENTION

The present invention preserves the advantages of prior art anti-pollution systems. In addition, it provides new advantages not found in currently available systems and overcomes many disadvantages of such currently available anti-pollution systems.

The invention is generally directed to a novel and unique anti-pollution system with particular application in eliminating pollutants from diesel exhaust. The anti-pollution system of the present invention enables the simple, easy and inexpensive assembly, use and maintenance of an easily retrofittable anti-pollution system. The present invention overcomes the problems inherent in previous attempts to remove pollutants from diesel exhaust, by continuously trapping and burning soot particulate in an efficient manner so that conventional catalytic converter techniques can be used to reduce any remaining unburned CO and CxHx from the exhaust gas stream. This system can be used to eliminate pollution from many different sources, including internal combustion engines, such as, but not limited to, those used in buses, trucks, cars, locomotives, boats, and stationary generators, and can also eliminate pollution from exhaust gas streams produced by sources other than combustion engines, such as, but not limited to, sewage treatment plants, incinerators, restaurant and bakery cooking exhaust, dry cleaner exhaust, spray paint facility exhaust, and manufacturing facilities. This invention is suitable for retrofit to existing pollution sources, and is also suitable for use by original equipment manufacturers.

The anti-pollution system consists of a combustion chamber, a radiant monolith section, a catalyst section, a fuel source system, an ignition system, a fresh air blower system, a heat exchanger system, and an electronic control system.

In the present and preferred method, exhaust gases from the pollution source are routed to an inlet chamber, into which fresh air can also be admitted from a fresh air blower system. The fresh air is admitted to the inlet chamber through a flapper valve mechanism normally only during initial start up of the combustion process, and during a purge/cool-down phase when the pollution source is turned off. The raw exhaust gases are routed through a heat exchanger system where they are preheated by heat extracted across a heat exchange surface from cleaned hot exhaust gases exiting the anti-pollution system. The preheated exhaust gases then enter a combustion chamber through a swirl chamber system that provides turbulent mixing of the exhaust gases with injected fuel. An ignition system ignites the mixed fuel-exhaust gas mixture. A portion of the entering exhaust gas stream may be diverted and used for premixing and to assist atomization of the fuel, particularly in the case where diesel fuel is the combustion fuel. A compressed air source may also be employed, either alone or in combination with a portion of the entering exhaust gas stream, as an assist to atomization and creation of an easily ignitable fuel-air-exhaust gas mixture.

The preferable combustion fuel for mobile pollution emitting sources is diesel fuel, but this invention is not limited to diesel fuel, but can include gasoline, various grades of fuel oil, propane, methane, natural gas, coal dust, or electricity. In the case of electricity the energy source can be direct or alternating current, and said electrical energy may be converted to heat by resistive element, by radiant energy, by radio frequency energy, by microwave frequency energy, or by laser energy.

The burning fuel-exhaust gas mixture is routed from the combustion chamber to a monolith thermal oxidizer-catalytic converter stack structure which provides restricted and tortuous pathways through which the burning fuel-exhaust gas mixture is forced to pass. Heat energy is transferred to the monolith stack so that by this means the monolith stack becomes a source of radiant heat energy. Soot particles within the exhaust gas stream that have not been burnt in the combustion chamber tend to be trapped within the twisted, tortuous pathways of the radiant monolith stack, and will thus experience a longer dwell time within the monolith stack than they would in an equivalent length of unobstructed combustion chamber. In addition, soot particles moving through the monolith stack will experience a high radiant heat energy field in the narrow pathways of the monolith thermal oxidizer-catalytic converter stack, which will considerably enhance heat absorption and combustion of the black carbon soot particles.

The preferred material for the monolith thermal oxidizer-catalytic converter stack is reticulated or foam ceramic with 10 pores per inch or more, but is not limited to this configuration or material, but can also be honeycomb or cell structured with multiple small passageways extending through the material, all passageways in parallel, with thin walls separating individual passageways. Materials for the monolith stack are not limited to ceramics of various types, but can also be fabricated from other refractory materials, from metal, or metal composites, or metal alloys.

The length of radiant monolith thermal oxidizer-catalytic converter stack can range from a few inches to many feet, depending on the particular application at hand and the desired characteristics, and is determined by the amount of pollution in the exhaust gas stream to be removed, the volume of the exhaust gas stream, and the cross sectional area of the monolith section. For example, 10 or 20 horse power engine will require much lower volume of radiant material than a 500 horse power engine.

Exhaust gases leaving the radiant monolith thermal oxidizer-catalytic converter stack are essentially cleaned of all soot particulate, and much of the unburned CO and CxHx have also been oxidized to $CO_2$ and $H_2O$. In addition, afterburning of the exhaust gas stream with a fuel rich mixture of diesel fuel and exhaust gases, can effect a reduction of $NO_x$ ranging from 30% to 75%. Additional cleaning and removal of remaining CO and CxHx can be accomplished by using conventional catalytic oxidation methods. The preferred embodiment of catalytic converter component of the invention is to coat appropriate catalyst materials onto reticulated ceramic materials, similar to those used for the radiant monolith thermal oxidizer stack.

Since soot particulate is essentially carbon with unburnt hydrocarbons coating the surface and pores of the carbon particles, and since carbon requires a minimum temperature of 1000° F. to burn, the radiant monolith temperature must average at least 1000° F. and preferably be considerably hotter. Optimum combustion with no trace of odor in the cleaned exhaust gas stream can be achieved at 1500° F., but such operation results in excessively hot exiting exhaust gas temperature and increased burner fuel consumption. A compromise temperature of 1250° F. is preferred for mobile applications. However, other temperatures may be selected depending on the application. An upper temperature limit is set by the catalyst materials and the requirement that the catalysts should not sinter or suffer a significant reduction in catalytic conversion efficiency.

Hot exhaust gases with temperatures of 1000° F. or greater, particularly if discharged at street level, are a potential hazard to pedestrians and to other vehicular traffic that might be in close proximity to the exhaust pipe discharge port. Clearly, the exiting exhaust gas temperature must be reduced to a safer temperature either by dilution and mixing with ambient air, or by heat exchanger techniques in which excess heat is captured and transferred from the hot outgoing exhaust to preheat the incoming cooler dirty exhaust from the engine. In the process the outgoing exhaust is cooled. For vehicles having exhaust discharge at roof level, higher exhaust gas discharge temperatures may be acceptable.

Exhaust gases leaving the catalytic oxidizer treatment section are routed into a heat exchanger section where exhaust gas temperature is reduced by extracting heat across a dividing wall to preheat the incoming raw engine exhaust. Air to air heat exchangers are notoriously inefficient, and require long interaction lengths and large cross sectional area. In the limited space constraints of a typical urban bus or truck, it will be difficult to achieve more than a few hundred degrees reduction in the temperature of the exiting cleaned exhaust gas stream. The heat exchanger is comprised of an outer annular chamber surrounding an inner cylindrical combustion region, monolith thermal oxidizer stack region, and catalytic converter stack region, with the common cylindrical wall, separating the inner cylindrical region from the annular outer region, serving as the heat transfer surface. Turbulence in the gas flows in both the inner and outer sections contributes to increased heat transfer efficiency, and additional baffles may be located in the exhaust gas flow regions to promote turbulence and to provide additional heat transfer surface area. The annular heat exchanger also acts to isolate or insulate the hot interior combustion regions from the exterior surface. An additional annular chamber region is provided exterior to the heat exchanger to act as an insulating layer 37. This improves the overall efficiency of the anti-pollution system and provides a safe temperature on the exterior surface of the anti-pollution system. Vacuum or numerous insulating materials appropriate for high temperature use can be used as the insulation medium for insulating layer 37.

In a preferred embodiment for diesel powered mobile vehicles, a fuel supply system consisting of fuel pump or pumps, filters, valves, and injection nozzle or nozzles supplies diesel fuel to a combustion chamber where it is mixed with preheated exhaust gas from the pollution source. The fuel source is not limited to diesel fuel, but can include gasoline, various grades of fuel oil, propane, methane, natural gas or electricity. Appropriate fuel delivery means and control means appropriate to the particular fuel source deliver fuel to the combustion region. An ignition system ignites the fuel-exhaust gas mixture. A preferred embodiment for an ignition system is an electrical spark ignition system consisting of one or more spark sources with spark electrodes located within the combustion region, but is not limited to spark ignition sources and can be hot surface ignitors, hot wires, glow plugs, flash lamp ignitor systems, laser ignitor systems, microwave ignitor systems, or pilot gas ignitor systems.

A fresh air blower or fan is provided to allow initial start up of the anti-pollution system prior to start up of the pollution source, should this be desired. This may be required for preheating the anti-pollution system and to provide instantaneous cleanup of the pollution source in cases where no warm up period can be tolerated. The fresh air blower is not normally used during normal operation when the pollution source is operating, as there is usually sufficient oxygen content in the exhaust gas stream to maintain combustion. However, it may be used at low flow rates of exhaust gas from the pollution source, to mix with the low exhaust gas flow and provide sufficient combustion air for the lowest fuel flow rates. When the pollution source is shut down the fresh air blower system is turned on to cool and purge the anti-pollution system, and to allow continued burning of entrapped soot particulate within the radiant monolith thermal oxidizer-catalytic converter stack and purging of all combustion products from the system.

A microcomputer or controller, typically consisting of an embedded microprocessor with multiple inputs and outputs, is used with appropriate sensors, relays, pumps, motors, solenoids, and valves to control the operating parameters of the anti-pollution system, and to monitor the status of the pollution source. The microcomputer monitors the status of the pollution source, temperature at several points within the anti-pollution system, back pressure exerted against the fresh air flow or exhaust gas flow, and oxygen level of the exhaust gas stream, fuel flow, and voltages on the electrical supply busses. The microcomputer senses the start up, or imminent start up, of the pollution source, and controls the start up sequence of the anti-pollution system. Then, the fresh air blower is started, power is supplied to the ignition system, fuel pump or pumps are started, fuel valves are opened, and fuel/air ignition is detected. Ignition failure after a prescribed number of tries and/or time, results in safe shut down of the anti-pollution system, and notification of the failure.

The volume of exhaust from the pollution source is monitored from the back pressure at the exhaust inlet, and fuel flow is adjusted to maintain a desired thermal oxidation temperature in the radiant monolith stack. When the desired operating temperature is reached, fuel flow is modulated to maintain the desired temperature. When the pollution source is stopped, the microcomputer senses this condition, stops fuel flow to the anti-pollution system, turns on the fresh air blower/fan and monitors the purge-cool down cycle of the system. This provides complete burn off of trapped soot particulate within the monolith stack, removes and burns any residual unburned fuel from the combustion chamber, and reduces temperatures within the system to safe levels.

The microcomputer stores and records critical operating parameters, out of specification conditions, voltage transients, etc. Diagnostic routines are built into the software, and download of data through a serial data port to a portable diagnostic/programming computer allow for monitoring, more extensive diagnostics, program modification and software code update.

It is therefore an object of the present invention to provide an anti-pollution system which eliminates virtually all of the pollutants from diesel exhaust.

Another object of the present invention is to provide an anti-pollution system which is easily retrofittable to existing vehicle exhaust systems.

It is a further object of the present invention to provide an anti-pollution system which does not significantly increase the temperature of the cleaned diesel exhaust over that discharged by the untreated vehicle.

It is yet a further object of the present invention to provide an anti-pollution system which includes continuous regeneration of its radiant monolith structure for trapping soot and particulate matter.

It is another object of the present invention to provide an anti-pollution system which is extremely efficient and includes thermal oxidation and added catalysts to assist in the incineration of diesel particulate matter.

BRIEF DESCRIPTION OF THE DRAWINGS

The novel features which are characteristic of the present invention are set forth in the appended claims. However, the inventions preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
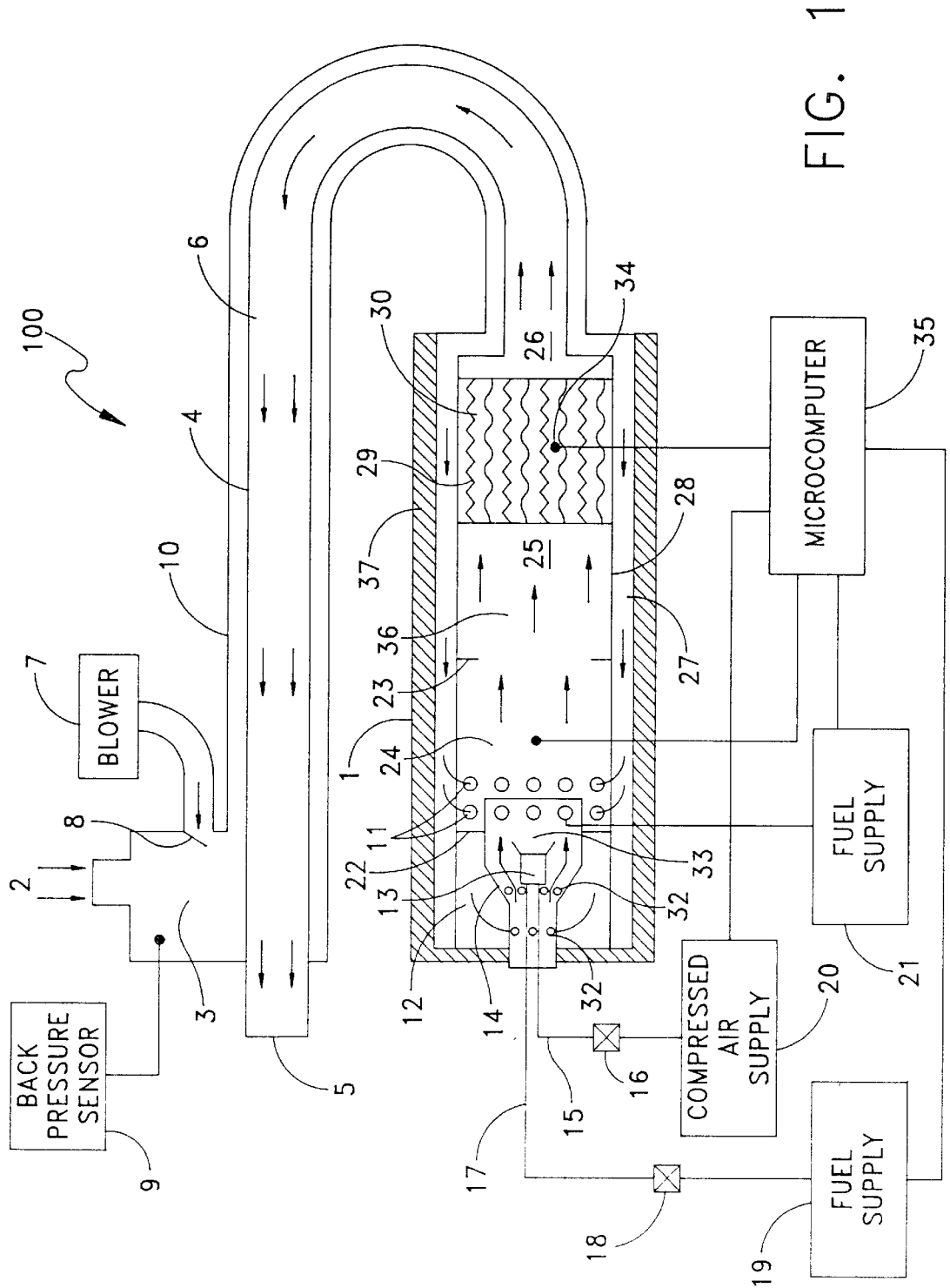
FIG. 1 is a diagrammatic view of the anti-pollution system of the present invention.

The present invention will be described with reference to a system 100 for thermal oxidation of soot particulate matter, unburnt CO and hydrocarbons, and reduction of $NO_x$ from the exhaust gases from a pollution source, such as a diesel engine. Referring to FIG. 1, exhaust gases from the pollution source enter the inlet port 2 of an inlet chamber 3, where fresh air from a blower/fan 7 can be admitted into the chamber through a one-way flapper valve 8. The flapper valve 8 allows fresh air to enter the inlet chamber 3, but prevents exhaust gases from the pollution source exiting the chamber 3 to the blower/fan system 7 whenever the blower/fan air pressure is lower than the exhaust gas pressure. A back pressure sensor 9, located in, or connected to, the inlet chamber, provides an output signal which is proportional of the volume of exhaust and/or fresh air entering the anti-pollution system. The exhaust gas/fresh air leave the inlet chamber and enter a secondary heat exchanger 10 where they are preheated by exchange of heat across a thermal exchange surface 4 from the hot cleaned exhaust gases 6 exiting the anti-pollution system to the atmosphere.

In FIG. 1 the secondary heat exchanger 10 is depicted as a simple annular structure of a pipe within a pipe; entering exhaust flows in the annular space between the inner and outer tubes, and hot exiting exhaust flows, as will be described in detail below, through the inner tube. In practice, the heat exchange surface or surfaces can be enhanced with fins, corrugations, stampings, etc. to enhance heat transfer efficiency. Increased surface area, gas stream velocity and turbulence result in more efficient heat transfer from the hot exiting exhaust stream to the cooler incoming exhaust stream. The primary heat exchanger 27 is depicted in FIG. 1 as an annular air space enclosing and extending along the length of the thermal oxidation-catalytic oxidation chamber of the anti-pollution system 1. An additional annular region 37, exterior to and surrounding the annular space 27, is provided to provide additional insulation, and to maintain a safe external surface temperature. This annular region 37 can be filled with high temperature insulating material or can be evacuated to provide a vacuum insulating layer. Incoming exhaust gases flowing through the annular space 27 are preheated by transfer of heat across a thermal exchange surface 28 from the thermal oxidation-catalytic oxidation chamber referenced as a whole as 24, 36, 29 and 30. As in the case of the secondary heat exchanger, the primary heat exchange surface or surfaces can be enhanced with fins, corrugations, stampings, etc. to enhance heat transfer efficiency.

The anti-pollution thermal oxidation-catalytic oxidation chamber 24, 36, 29 and 30 consists of six main sections or regions. At one end is located a burner unit 12, 14, 24 with fuel injection nozzle or nozzles 13 located within a flame holding structure 14, and having premixing and swirl regions 12 and 24, respectively. A free space combustion region 36 and a radiant monolith thermal oxidation region 29, and a catalytic converter region 30, comprise the other regions. Preheated exhaust gases enter the thermal oxidation chamber (24, 36, 29, 30) at one end through a series of orifices 11 in the outer wall of the chamber, located in such a way as to create a swirling gas motion within a swirl chamber 24. The swirl chamber 24 is defined longitudinally by aperture plates or baffles 22 and 23. A series of orifices (not shown) in aperture plate 22 allow a portion of the gas flow to enter a burner premixing region 12 where the gas flows then enter the flame holding burner cone structure 14 through a series of staged orifices 32. In a preferred embodiment described here an atomizing nozzle or nozzles 13 utilizing pressurized fuel are used to create a fine fuel mist, which is mixed with compressed air from air source 20 supplied by tubing 15 to annularly located orifices 32 surrounding each fuel nozzle 13, and also with a portion of the preheated exhaust gas flow entering from the premixing chamber 12. The compressed air supply 20 is controlled by the microcomputer 35 operating air valve or valves 16. The mixed fuel, air, exhaust gas mixture is ignited by an ignition system 21 and ignition device or devices 33 within the flame holding burner cone structure 14. A temperature/flame sensor 31 detects the presence or absence of flame within the flame holder region 14 and swirl chamber 24, and is used in conjunction with a microcomputer 35 to control fuel supply 19 and fuel valve or valves 18 to supply metered fuel 17 to the fuel nozzle or nozzles 13.

The burning fuel-exhaust gas mixture is then turbulently mixed with the rest of the exhaust gas flowing into the swirl chamber. The expanding burning gases leave the swirl chamber 24 through an aperture plate 23 and enter the free space combustion region 36 where combustion continues and some of the pollutants are burnt. The combustion gases then enter the monolith stack 29 at port 25 and are forced to follow a torturous path through the monolith stack 29, where the burning hot gases heat the monolith 29 to a temperature above 1,000° F. so that it glows red and becomes a source of radiant infra-red heat energy. The tortuous narrow pathways cause trapping of soot particulate on the web surfaces of the monolith stack 29, where continuous burning of the particulate occurs in the intense radiant temperature field. The pore size and pore size variation or gradation throughout the monolith stack 29 is chosen for optimum filtration and burning of pollutants from the gas stream. The length and distribution of radiant monolith stack 29 and catalyst coated monolith stack 30 are chosen to optimize performance of the anti-pollution system. The cleaned exhaust gas stream then leaves the monolith-catalyst stack 29, 30 at port 26 and enters the secondary heat exchanger section, where the hot clean exhaust gases are cooled before discharge to the atmosphere 5 by interaction with the heat transfer surfaces of the heat exchanger by which process heat is transferred to the much cooler incoming dirty raw exhaust gas stream. Additional dilution and mixing of the hot exhaust with ambient air may be necessary to achieve a safe exhaust gas discharge temperature.

A temperature sensor or sensors 34 are located within the monolith thermal oxidation-catalytic oxidation stack and are connected to the microcomputer 35. The temperature of the monolith stack 29 is controlled to maintain a set-point temperature in the range 1000°–1700° F. By such temperature control the fuel supply to the combustion regions 24, 36, 29, 30 can be modulated to maintain quasi-continuous thermal oxidation. In contrast to prior art systems which rely solely on free space combustion, as for example the system described in U.S. Pat. No. 5,572,866, in which thermal oxidation only occurs during combustion whilst fuel is being supplied and is burning, the system described in accordance with the present invention provides thermal oxidation not only while fuel is supplied and burning in the free space combustion section 36, but also whenever the radiant monolith thermal oxidation-catalytic oxidation stack 29, 30 is above 1000° F. For example, when the pollution source is turned off, and the monolith stack temperature is above 1000° F., the fresh air blower or fan 7 is activated, any trapped particulate and unburnt hydrocarbons within the monolith stack 29, 30 and also contained within the volume of exhaust in regions of the anti-pollution system upstream of the monolith stack 29 region will continue to burn within the monolith stack 29, 30 as a result of the continued fresh air supply. The monolith stack temperature is observed to increase during the burn-off process and then to decrease as all trapped particulate is burned. Inspection of the monolith stack 29, 30 after system shut down shows a clean pristine monolith with no sign of soot or other particulate matter.

The microcomputer 35 runs control software to provide overall monitoring and control of the anti-pollution system 100 of the present invention. The microcomputer 35 can be programmed to be continuously operational, so that the microcomputer 35 is in a waiting state until the pollution source is started. Detection of an ignition start up sequence for the pollution source, as for example, when the pollution source ignition switch is turned on, can be used to initiate start up of the anti-pollution control system 100. For time dependent pollution sources, which, for example, always start at a particular time each day, the microcomputer 35 can be programmed to start before the pollution source so that the anti-pollution system 100 reaches its operating temperature before the pollution source is started, and thus provides cleaning of the exhaust gas stream with no start up delay or warm up period during which undesirable pollutants could be emitted to the atmosphere. Sensor input signals to the microcomputer 35 from pressure 9, flow and temperature sensors 31, 34 allow the microcomputer 35 to sense the operating conditions of both the pollution source and of the anti-pollution system 100. Fuel flow, compressed air supply 20, fresh air blower 7 and ignition system 21 are all operated under control of the microcomputer 35 to maintain the correct fuel and air supplies under all operating conditions of the pollution source so that thermal oxidation and removal of pollutants is optimized over the operating range of the pollution source. The microcomputer 35 also monitors the existence or absence of flame and in the event of ignition or component failure provides safe shut down of the system and appropriate annunciation to maintenance personnel.

It would be appreciated by those skilled in the art that various changes and modifications can be made to the illustrated embodiments without departing from the spirit of the present invention. All such modifications and changes are intended to be covered by the appended claims. For example, cylindrical and annular cross-sections have been used in describing the illustrated embodiments of the invention, but elliptical, rectangular, square, or other geometrical cross-sectional shapes could equally well be used, separately, or in combination, in any particular embodiment or application.

What is claimed is:

1. An anti-pollution system for removing and reducing pollutants from an exhaust gas stream, comprising:

a) a combustion, thermal and catalytic oxidation chamber having an insulating layer positioned about and surrounding said combustion, thermal and catalytic oxidation chamber;

b) a burner section to burn fuel material connected to said combustion, thermal and catalytic oxidation chamber; said burner section including at least one fuel nozzle within a flame retaining burner means; said burner section being connected to a mixing section and a swirl section via holes for admitting a portion of preheated exhaust gases from a pollution source to generate a burning fuel gas mixture; said burning fuel gas mixture being mixed with the remainder of the preheated exhaust gases from a pollution source in said mixing section and said swirl section by creation of a swirling vortex region within said swirl section;

c) aperture plates being positioned within said combustion, thermal and catalytic oxidation chamber to divide and define said combustion, thermal and catalytic oxidation chamber into respective mixing, swirl and combustion regions; said annular aperture plates controlling gas flow characteristics between and within each region;

d) a radiant monolith oxidation stack and catalyst oxidation stack section, having tortuous and narrow pathways, through which burning fuel and exhaust gas mixture is forced to flow; said radiant monolith oxidation stack and catalyst oxidation stack section trapping particulate matter, slowing particulate flow, combusting particulate, CO and unburnt hydrocarbons and extracting and exchanging heat from the burning fuel gas mixture to maintain said radiant monolith oxidation stack at sufficiently high temperature to be a glowing radiant source of infra-red heat energy;

e) said radiant monolith stack operating at a temperature in the range of about 1000° to 1700° F. thus defining a maximum operating temperature and a minimum operating temperature; said maximum operating temperature being less than that which would cause significant sintering or degradation of catalyst materials in the radiant monolith oxidation stack and catalyst oxidation stack section, and a minimum operating temperature being greater than the minimum combustion temperature for carbon;

f) a fuel injection system having at least one fuel nozzle having a mixing means for combining with air and exhaust gases to produce a combustible mixture of fuel, air and gas within said burner section and for further combining with a portion of exhaust gas flow from a pollution source;

g) an ignition means for igniting a mixture of fuel, air and gas within the burner section; and h) a microcomputer controller means for receiving and processing data from system parameter sensors and controlling fuel flow, compressed air supply, forced fresh air supply, and ignition system.

2. The anti-pollution system of claim 1, wherein said insulated combustion, thermal and catalytic oxidation chamber is annular in configuration.

3. The anti-pollution system of claim 1, wherein said insulated combustion, thermal and catalytic oxidation chamber further includes therein a co-axial inner cylindrical combustion chamber.

4. The anti-pollution system of claim 1, wherein said insulated combustion, thermal and catalytic oxidation chamber further includes therein an annular heat exchange section located co-axial with and surrounding an inner cylindrical combustion chamber and between the inner cylindrical combustion chamber and said insulating layer.

5. The anti-pollution system of claim 1, further comprising:

a forced fresh air means connected via a one-way valve to an inlet chamber for supplying fresh air to be combined with exhaust gases during any part of an operating cycle of the anti-pollution system.

6. The anti-pollution system of claim 1, further comprising:

a secondary heat exchanger means positioned between the output of said radiant monolith oxidation stack and catalyst oxidation stack section and the exhaust discharge port to atmosphere for reducing exiting exhaust gas temperature to safe levels and providing additional preheat of incoming raw exhaust from a pollution source.

7. The anti-pollution system according to claim 1, wherein said fuel material is natural gas.

8. The anti-pollution system according to claim 1, wherein said fuel material is propane.

9. The anti-pollution system according to claim 1, wherein said radiant monolith oxidation stack and catalyst oxidation stack section is manufactured of reticulated ceramic having a pore density in the range of about 10–100 per inch.

10. The anti-pollution system of claim 9, wherein said pore density is uniform along the length of said radiant monolith oxidation stack and catalyst oxidation stack section.

11. The anti-pollution system of claim 9, wherein said pore density is graded along the length of said radiant monolith oxidation stack and catalyst oxidation stack section.

12. The anti-pollution system of claim 9, wherein said radiant monolith oxidation stack and catalyst oxidation stack section further includes sub-sections of different materials.

13. The anti-pollution system of claim 12, wherein a section closest to said combustion, thermal and catalytic oxidation chamber is made of a material selected from the group consisting of: silicon carbide, cordierite and alumina.

14. The anti-pollution system of claim 12, wherein said catalyst oxidation stack of said radiant monolith oxidation stack and catalyst oxidation stack section is made of a material selected from the group consisting of: silicon carbide and cordierite.

15. The anti-pollution system of claim 10, wherein said radiant monolith oxidation stack and catalyst oxidation stack section is made of a material selected from the group consisting of: silicon carbide, cordierite, alumina, and zirconia tuffened mullite.

16. The anti-pollution system according to claim 1, wherein said radiant monolith oxidation stack and catalyst oxidation stack section is manufactured of cell ceramic having a cell density in the range of about 64–400 cells per square inch.

17. The anti-pollution system of claim 16, wherein said cell density is uniform along the length of said radiant monolith oxidation stack and catalyst oxidation stack section.

18. The anti-pollution system of claim 16, wherein said cell density is graded along the length of said radiant monolith oxidation stack and catalyst oxidation stack section.

19. The anti-pollution system of claim 16, wherein said radiant monolith oxidation stack and catalyst oxidation stack section further includes sub-sections of different materials.

20. The anti-pollution system of claim 19, wherein a section closest to said combustion, thermal and catalytic oxidation chamber is made of a material selected from the group consisting of: silicon carbide, cordierite and alumina.

21. The anti-pollution system of claim 16, wherein said catalyst oxidation stack of said radiant monolith oxidation stack and catalyst oxidation stack section is made of a material selected from the group consisting of: silicon carbide and cordierite.

22. The anti-pollution system of claim 17, wherein said radiant monolith oxidation stack and catalyst oxidation stack section is made of a material selected from the group consisting of: silicon carbide, cordierite, alumina, and zirconia tuffened mullite.

23. The anti-pollution system according to claim 1, wherein said radiant monolith oxidation stack and catalyst oxidation stack section is manufactured of a metal monolithic structure having a cell density in the range of about 100–400 cells per square inch.

24. The anti-pollution system of claim 23, wherein said cell density is uniform.

25. The anti-pollution system of claim 23, wherein said cell density is graded along the length of said radiant monolith oxidation stack and catalyst oxidation stack section.

26. The anti-pollution system according to claim 2, wherein said radiant monolith oxidation stack and catalyst oxidation stack section is manufactured of a metal monolithic structure having a cell density in the range of about 100–400 cells per square inch.

27. The anti-pollution system of claim 26, wherein said cell density is uniform.

28. The anti-pollution system of claim 26, wherein said cell density is graded along the length of said radiant monolith oxidation stack and catalyst oxidation stack section.

* * * * *